(12) United States Patent
Pai

(10) Patent No.: US 7,226,012 B2
(45) Date of Patent: Jun. 5, 2007

(54) GRATER DISC

(76) Inventor: Chung-Jen Pai, 1F, No. 83, Lane 26, Chung Hsiao Street, Chung Ho, Taipei Hsien (TW)

(*) Notice: Subject to any disclaimer, the term of this patent is extended or adjusted under 35 U.S.C. 154(b) by 0 days.

(21) Appl. No.: 10/834,937

(22) Filed: Apr. 30, 2004

(65) Prior Publication Data
US 2005/0218251 A1 Oct. 6, 2005

(30) Foreign Application Priority Data
Mar. 30, 2004 (TW) .............................. 93204828 U

(51) Int. Cl.
*A47J 43/25* (2006.01)
*A47J 43/00* (2006.01)
(52) U.S. Cl. ................... 241/273.2; 241/91; 241/92; 241/273.1

(58) Field of Classification Search ................. 241/91, 241/92, 94, 95, 273.1, 273.2
See application file for complete search history.

(56) References Cited

U.S. PATENT DOCUMENTS

| | | | | |
|---|---|---|---|---|
| 1,016,338 A | * | 2/1912 | Lannoye | 241/273.1 |
| 1,714,367 A | * | 5/1929 | Hileman | 241/167 |
| 1,802,203 A | * | 4/1931 | Dosch | 241/273.1 |
| 2,013,900 A | * | 9/1935 | Settles | 241/273.2 |
| 2,352,122 A | * | 6/1944 | Richardson | 241/245 |
| 4,037,793 A | * | 7/1977 | Puustinen | 241/30 |

* cited by examiner

*Primary Examiner*—Lowell A. Larson
*Assistant Examiner*—Jason Y. Pahng
(74) *Attorney, Agent, or Firm*—Troxell Law Office, PLLC

(57) ABSTRACT

The present invention discloses an improved grater disc having a plurality of grater holes on a disc and at least one grater blade with an angle not less than 90 degrees protruded from the periphery of each grater hole.

2 Claims, 3 Drawing Sheets

GRATER DISC

BACKGROUND OF THE INVENTION

1. Field of the Invention

The present invention relates to a grater disc, more particular to a grater disc capable of grating chunks of food into powder.

2. Description of the Related Art

In western cuisines, chunks of cheese or chocolate are generally grated into powder and spread onto food to give better flavors to the food. The common graters usually have grater holes stamped out from a piece of metal plate, and the food is grated back and forth on the grater manually or electrically into powder. Therefore, the quality of the powder grated by the abovementioned process depends on and closely relates to the style and size of the grater holes.

For example, a common grater disc generally comprises a plurality of grater holes stamped out from a plate and a curved protrusion adjacent to each grater hole for slicing food. If the diameter and height of the grater holes and protrusions are large, then the food will be sliced into bars; if the diameter and height of the grater holes and protrusion are reduced, then the food such as cheese will be adhered easily due to the oily property of the food. As a result, the grated food is grated into thin threads instead of powder. Such issue exists and has been bothering consumers for long.

In view of the foregoing shortcomings, manufacturers design another model of the grater disc by using a manufacturing tool to punch a plurality of conical bodies from a metal plate, and the top of the conical body has a cracked opening similar to that of a volcanic crater and a plurality of crevices cut around the periphery to define a plurality of cutting plates. When such grater disc is in use, food is grated back and forth on the conical bodies and sliced by the cutting plates, so that the powder can fall downward. This model of grater disc definitely can grate chunks of food into powder, but there are concave spaces between the conical bodies, and the powder not falling out from the grater holes will be accumulated into the concave spaces. Particularly, if the food such as cheese will be softened and sticky when it is placed at a normal temperature for some time, the accumulated powder will be aggregated into a chunk, which cannot be cleared or cleaned easily. If the accumulated cheese is at the same height of the conical body, then it will affect the grating effect.

SUMMARY OF THE INVENTION

In view of the foregoing shortcomings, the inventor of the present invention based on years of experience on the kitchenware and the spirit of improving the product to overcome the shortcomings of the prior-art grater disc to conduct extensive researches and experiments, and finally invented the improved grater disc in accordance with the invention.

The primary objective of the present invention is to provide an improved grater disc having a plurality of grater holes on a disc and at least one grater blade with an angle not less than 90 degrees protruded from the periphery of each grater hole.

The secondary objective of the present invention is to provide an improved grater disc having a plurality of grater blades with an angle between 90 degrees to 130 degrees protruded from the periphery of each grater hole.

BRIEF DESCRIPTION OF THE DRAWINGS

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

Figure 1:
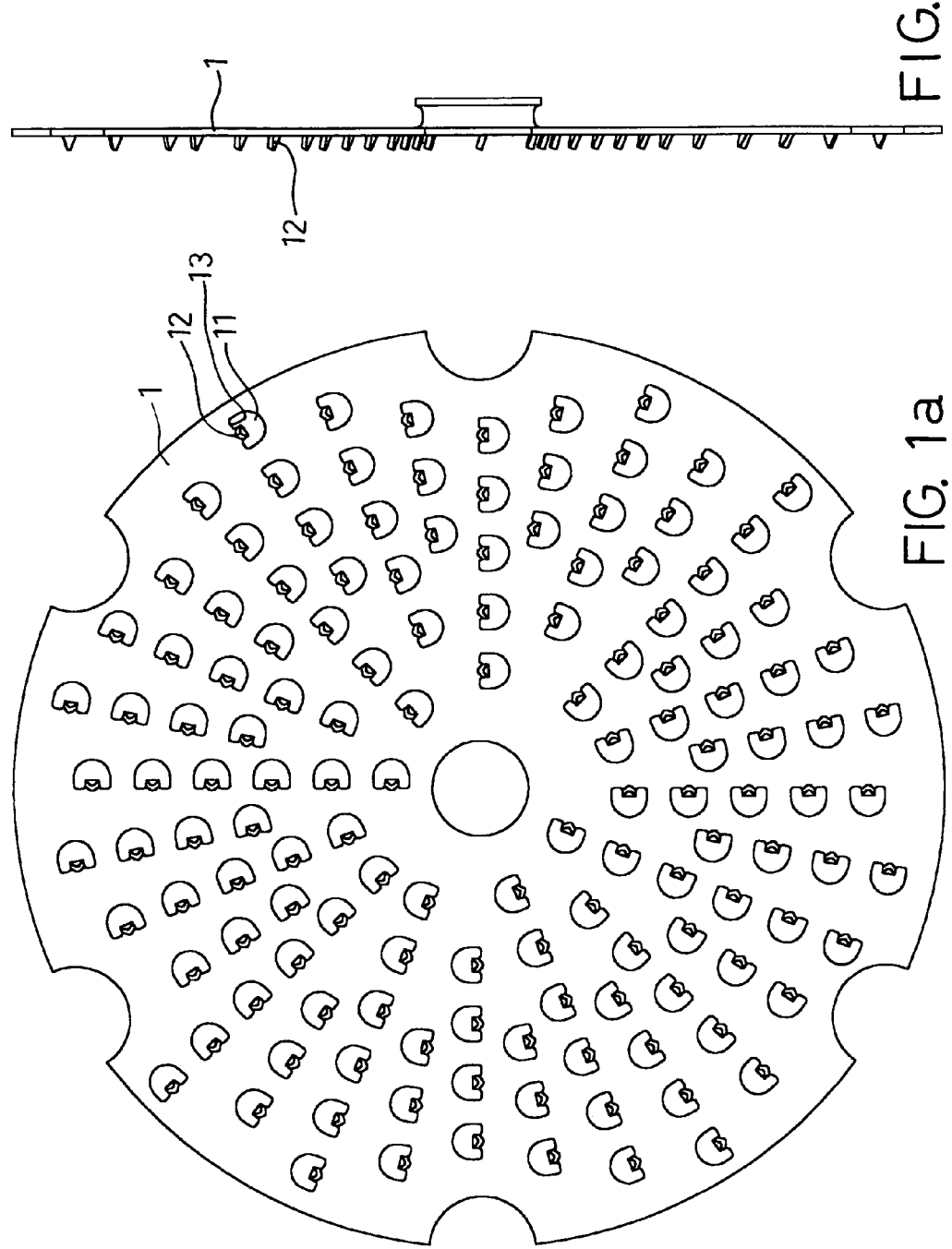
FIGS. 1a and 1b are a top view and a side view of the grater disc of the present invention respectively.
Figure 2:
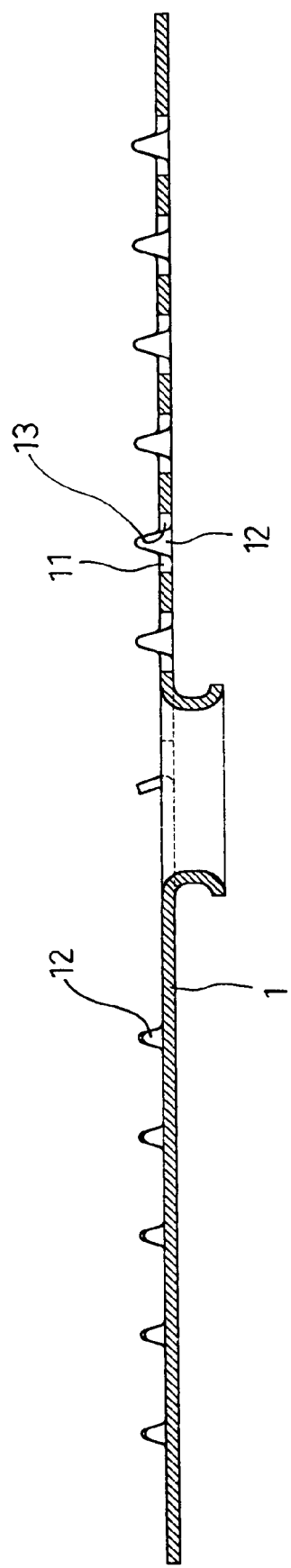
FIG. 2 is a cross-sectional view of the grater disc of the present invention.

Please refer to FIGS. 1a and 1b. The grater disc of the present invention forms a plurality of grater holes 11 on the surface of a plate 1, such as the holes punched from a plate, and the grater holes 11 are disposed alternately, and at least one grater blade 12 is protruded preferably at an angle between 90 degrees to 130 degrees from the periphery of each grater hole 11. Further, the grater blade 12 is located on the same side of the grater hole 11; for example, each grater blade 12 is located on a smooth edge 13 on one side of the grater hole 11. Therefore, when food is grated, the food is grated back and forth on the grater blades 12, so that the grated powder falls from the grater hole 11 onto the surface of the grater blade 12.

Please refer to the figures again, the grater blade 12 is preferably in a triangular shape, so that the sharp tip can grate finer powder, and the broader base gets a better structural stress. In addition, the grate disc of the invention is not limited to a circular shape, but it can be designed in the plate of a rectangular shape, an arc shape, or even a roller shape. All these shapes fall within the scope of the claims of the invention.

Figure 3:
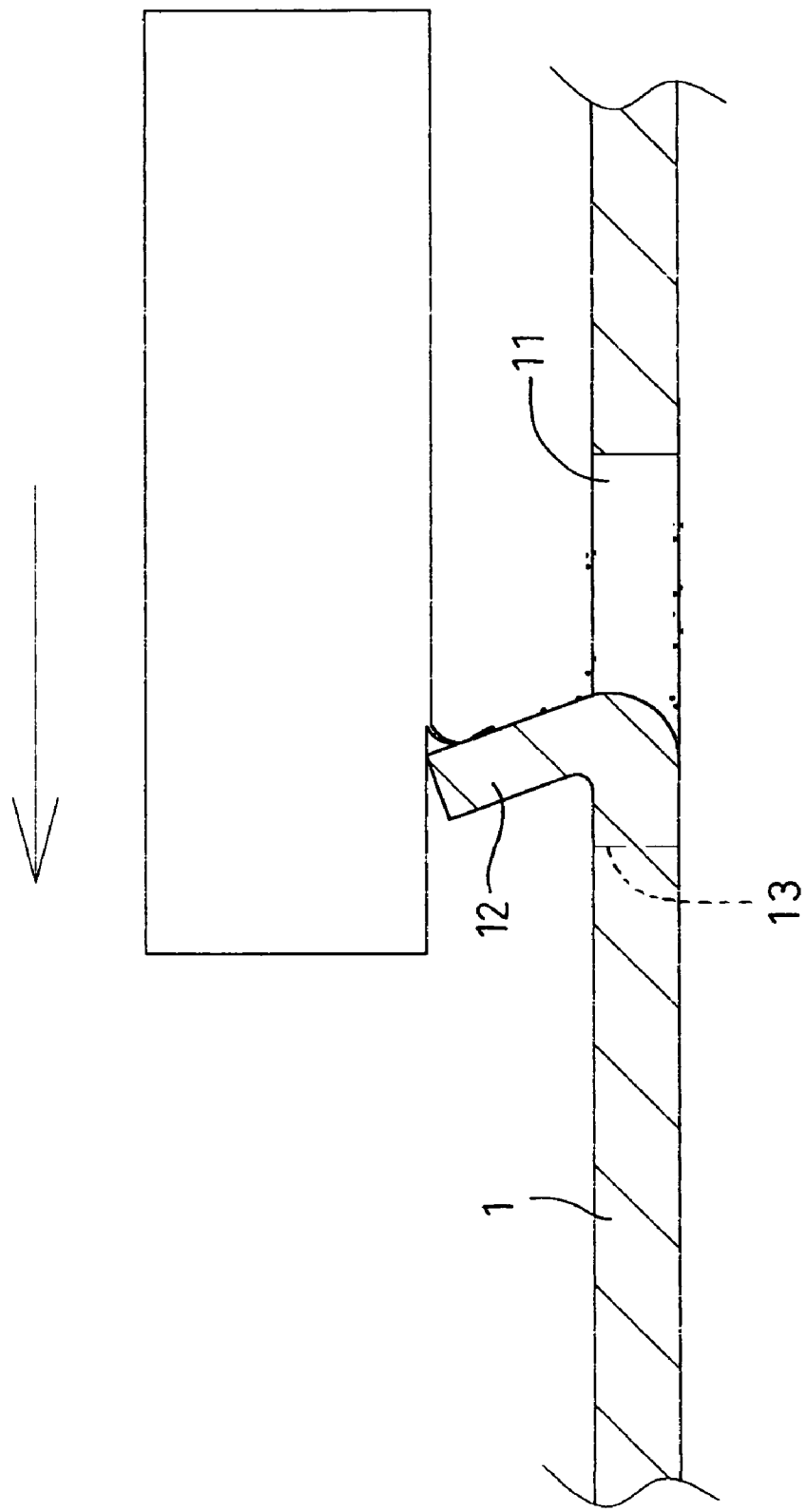
FIG. 3 is an illustrative view of the grater disc being used for grating and slicing food according to the present invention.

Please refer to FIG. 3 for the principle of grating chunks of food into power as follows: If a chunk of food is moved on the grate disc, the food will be grated into thin threads which will continuously hit the wall at the top of the grater blade 12 to cut or crack the food since the angle of the grater blade is not smaller than 90 degrees. The powder will fall out from the grater hole 11, and users can obtain the expected powder food.

With the implementation of the invention, the prior-art grater disc which can only cut food into bars or threads is improved, and the powder will not be accumulated onto the grater disc. The invention grates food into powder and also allows the grated food to fall off from the grater hole along the grater blade, which can eliminate the phenomenon of accumulating powder. It is definitely a great idea for the product of this sort.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A grater disc comprising:

a plate having a plurality of grater holes, each of the plurality of grater holes having at least one triangular shaped grater blade positioned at an angle not less than 90 degrees from a periphery thereof, each of the at least one triangular shaped grater blade of each of the plurality of grater holes is alternately spaced on a plurality of radially extending lines located on the plate, each of the plurality of grater holes has a peripheral edge including a curved portion and a straight portion, the at least one triangular shaped grater blade of each of the plurality of grater holes is located on the straight portion opposite the curved portion and spaced apart a predetermined spacing distance from the edge of the curved portion, wherein the at least one triangular shaped grater blade of each of the plurality of grater holes and the plate have a common thickness, the predetermined spacing distance that the at least one triangular shaped grater blade of each of the plurality of grater holes is spaced from the edge of the curved portion is greater than the common thickness, wherein each of the at least one triangular shaped grater blade is positioned at an angle between 90 degrees and 130 degrees from the periphery of one of the plurality of grater holes.

2. The grater disc according to claim 1, wherein each of the plurality of radially extending lines is equally spaced between two adjacent radial lines of the plurality of radially extending lines and is located in a common plane.

* * * * *